United States Patent
Aten et al.

(10) Patent No.: US 9,086,034 B2
(45) Date of Patent: Jul. 21, 2015

(54) THRUST REVERSER CASCADE ASSEMBLY WITH FLOW DEFLECTION SHELF

(75) Inventors: Michael Ray Aten, San Diego, CA (US); Sara Christine Crawford, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 587 days.

(21) Appl. No.: 13/308,865

(22) Filed: Dec. 1, 2011

(65) Prior Publication Data

US 2013/0092755 A1 Apr. 18, 2013

Related U.S. Application Data

(60) Provisional application No. 61/546,737, filed on Oct. 13, 2011.

(51) Int. Cl.
*F02K 1/72* (2006.01)

(52) U.S. Cl.
CPC . *F02K 1/72* (2013.01); *Y02T 50/672* (2013.01)

(58) Field of Classification Search
CPC .............. F02K 1/72; F02K 1/70; B64D 33/02; B64D 2033/0226; F02C 7/04
USPC ............... 60/226.2, 230; 239/265.19, 265.31; 244/110 B
See application file for complete search history.

(56) References Cited

U.S. PATENT DOCUMENTS

| | | | |
|---|---|---|---|
| 2,945,346 A * | 7/1960 | Arnzen | 239/265.29 |
| 3,500,644 A | 3/1970 | Hom et al. | |
| 3,500,645 A | 3/1970 | Hom et al. | |
| 3,500,646 A | 3/1970 | Hom et al. | |
| 3,503,211 A | 3/1970 | Medawar et al. | |
| 3,511,055 A | 5/1970 | Timms | |
| 3,981,451 A | 9/1976 | Prior et al. | |
| 4,005,822 A | 2/1977 | Timms | |
| 4,026,105 A | 5/1977 | Varnell | |
| 4,185,798 A | 1/1980 | Dickenson | |
| 4,340,178 A | 7/1982 | Lawson | |
| 4,545,199 A | 10/1985 | Sankey et al. | |

(Continued)

FOREIGN PATENT DOCUMENTS

| | | |
|---|---|---|
| EP | 1457659 A2 | 9/2004 |
| EP | 1462642 A1 | 9/2004 |
| GB | 925010 A | 5/1963 |

OTHER PUBLICATIONS

Chinese Office Action (Chinese App. No. 200910150313.4), dated Mar. 3, 2011, (including English translation), pp. 1-10.

(Continued)

*Primary Examiner* — Ted Kim
(74) *Attorney, Agent, or Firm* — Snell & Wilmer, L.L.P.

(57) ABSTRACT

An aircraft engine thrust reverser cascade assembly includes a plurality of circumferentially spaced cascade segments, each cascade segment including a plurality of spaced vanes, including an aft-most vane, and rails defining a series of cells or air passages therebetween. The cascade assembly also includes an aft cascade ring removably attached to the aft ends of the cascade segments. A flow deflection shelf is mounted to each of the cascade segments and includes a deflector portion that at least partially extends forward of a group of cells of the cascade segments along which the flow deflection shelf is mounted. The deflector portion is configured to at least partially redirect at least a portion of a volume of air forwardly as the air outwardly passes through the group of cells of the cascade segments.

14 Claims, 7 Drawing Sheets

(56) References Cited

U.S. PATENT DOCUMENTS

| | | | |
|---|---|---|---|
| 4,564,160 A | 1/1986 | Vermilye | |
| 4,778,110 A | 10/1988 | Sankey et al. | |
| 4,922,713 A | 5/1990 | Barbarin et al. | |
| 4,998,409 A | 3/1991 | Mutch | |
| 5,228,641 A | 7/1993 | Remlaoui | |
| 5,239,822 A | 8/1993 | Buchacher | |
| 5,309,711 A | 5/1994 | Matthias | |
| 5,655,360 A | 8/1997 | Butler | |
| 5,778,659 A | 7/1998 | Duesler et al. | |
| 5,806,302 A | 9/1998 | Cariola et al. | |
| 6,082,096 A * | 7/2000 | Vauchel | 60/226.2 |
| 6,151,883 A | 11/2000 | Hatrick | |
| 6,170,254 B1 | 1/2001 | Cariola | |
| 6,474,059 B2 | 11/2002 | Stretton | |
| 6,546,715 B1 | 4/2003 | Blevins et al. | |
| 6,568,172 B2 | 5/2003 | Jannetta et al. | |
| 6,584,763 B2 | 7/2003 | Lymons et al. | |
| 6,824,101 B2 | 11/2004 | Sternberger et al. | |
| 7,124,981 B2 | 10/2006 | Parham | |
| 7,334,395 B2 | 2/2008 | Tweedie et al. | |
| 8,511,062 B2 * | 8/2013 | Ramlaoui et al. | 60/226.2 |
| 2002/0124550 A1 | 9/2002 | Stretton | |
| 2004/0159741 A1 | 8/2004 | Sternberger et al. | |
| 2006/0277895 A1 | 12/2006 | Thomock et al. | |
| 2009/0314887 A1 * | 12/2009 | Aten et al. | 60/226.2 |
| 2010/0229528 A1 * | 9/2010 | Ramlaoui et al. | 60/226.2 |

OTHER PUBLICATIONS

European Search Report (EP Pub. No. EP 2 138 697), dated Mar. 30, 2011, pp. 1-3.

European Examination Report (EP Pub. No. EP 2 138 697), dated Apr. 19, 2011, pp. 1-5.

* cited by examiner

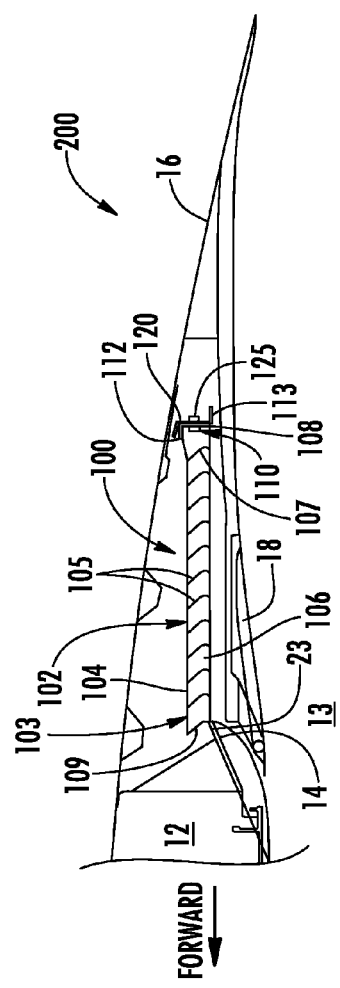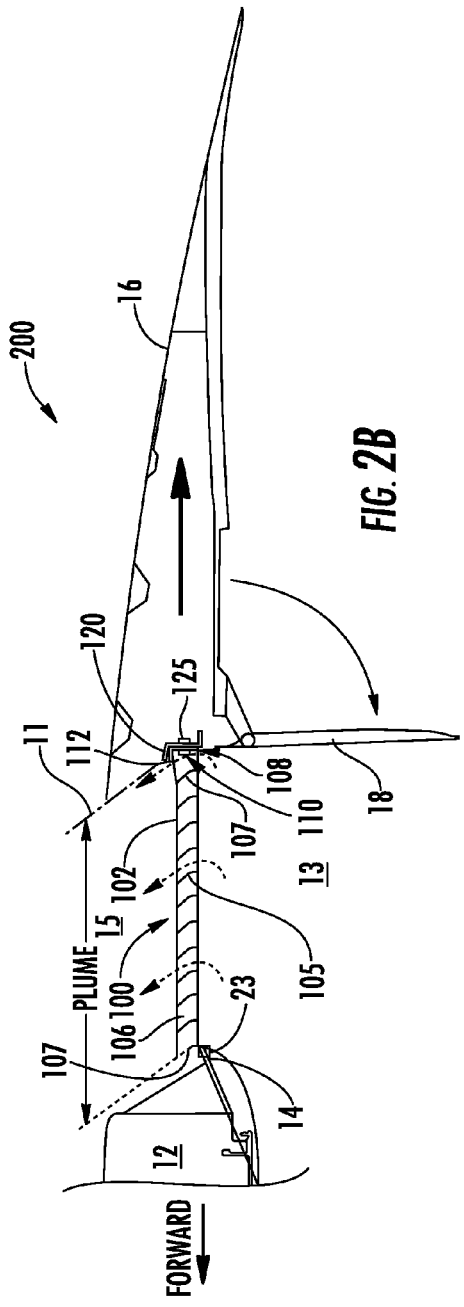

THRUST REVERSER CASCADE ASSEMBLY WITH FLOW DEFLECTION SHELF

RELATED APPLICATIONS

This application claims the benefit of U.S. provisional application Ser. No. 61/546,737 filed Oct. 13, 2011, the disclosure of which is hereby incorporated by reference in its entirety.

FIELD OF THE INVENTION

The invention generally relates to thrust reversers for turbofan aircraft engines, and in particular relates to a thrust reverser cascade assembly including a flow deflection shelf that turns at least some of a turbofan engine's annular fan flow in the forward direction when the associated thrust reverser cascade is deployed.

BACKGROUND

Modern turbofan aircraft engines include thrust reversers that selectively reverse the direction of an engine's annular fan flow for use in decelerating an aircraft after touchdown. One type of thrust reverser for a turbofan engine includes a cascade array mounted in a selectively closable outlet opening in an engine's fan air duct. The cascade array includes a plurality of spaced, cascading vanes that redirect fan air flow along the engine's annular fan duct from an aftward direction to an outward and forward direction when the thrust reverser is deployed. Examples of various cascade-type thrust reversers are described and shown in, for example, U.S. Pat. No. 5,309,711; U.S. Pat. No. 6,170,254; and U.S. Pat. No. 6,546,715; all assigned to Rohr, Inc.

Portions of a typical cascade-type thrust reverser 10 for a turbofan aircraft engine 5 are shown in FIGS. 1A-1E. As shown in FIG. 1A, the cascade thrust reverser 10 includes a translating sleeve 16 that forms an aft portion of a nacelle surrounding the engine's annular fan duct 13. The translating sleeve 16 is movably connected to the aft end of a stationary portion 12 of the nacelle. For normal aftward fan flow through the engine's fan duct 13, the translating sleeve 16 is positioned immediately behind the stationary portion 12 of the nacelle and confines the fan flow within the fan duct 13. As shown in FIGS. 1A-1C, when the thrust reverser 10 is deployed, the translating sleeve 16 is moved aftward, thus providing an outlet opening 15 between the stationary portion 12 and the forward end of the translating sleeve 16. The outlet opening 15 typically extends on either side of a supporting engine pylon 7, and around a substantial portion of the circumference of the engine 5, and permits fan flow to be discharged from the engine's annular fan duct 13 to provide reverse thrust for slowing a landed aircraft. As shown in FIG. 1C, a plurality of blocker doors 18 proximate the forward end of the translating sleeve 16 are deployed to block aftward fan flow within the annular fan duct 13, and to force the fan flow to exit the engine through the outlet opening 15.

As shown in FIGS. 1A and 1B, a cascade assembly 20 is disposed within the exit opening 15, and typically includes a plurality of circumferentially arranged cascade segments 28. As shown in FIG. 1C, the cascade segments 28 include pluralities of spaced vanes 25 configured to turn the exiting fan flow to an at least partially forward direction in order to provide reverse thrust. The vanes 25 typically are supported between a plurality of longitudinal support members 26. The aft ends of the cascade segments 28 are interconnected by an aft cascade ring 30 that ties the cascade segments 28 together, and stiffens the cascade assembly 20 against outward deflection. As shown in FIG. 1D, the aft end of each cascade segment can include an end flange 29, and can be connected to the aft cascade ring 30 by a plurality of removable fasteners 21.

In the embodiment shown in FIGS. 1C and 1D, the aft cascade ring 30 includes an outer portion 36 and an inner portion 34 that are each connected to opposed ends of a body portion 32 at right angles. The substantially Z-shaped cross-section of the cascade ring 30 provides the ring with substantial stiffness against bending and twisting, though all portions 32, 34 and 36 of the ring are relatively thin. As also shown in FIGS. 1C and 1D, an aft vane 27 in each cascade segment 28 defines the rearmost extent 11 of the exhaust plume as the redirected fan flow exits the outlet opening 15. As shown in FIG. 1D, the aft vane 27 is positioned forward of the aft cascade ring 30, and the aft cascade ring 30 is positioned behind the rearmost extent 11 of the exhaust plume by a distance "a". Accordingly, the aft cascade ring 30 has no substantial or direct effect on turning the exiting fan flow as the flow passes through the exit opening 15.

Another configuration of a known aft cascade ring 60 is shown in FIG. 1E. In this arrangement, each cascade segment 58 includes a rearward extending flange 52 for connection to a forward extending flange 63 of aft cascade ring 60 with a plurality of removable fasteners 21. The aft cascade ring 60 generally includes a body portion 69 and opposed inner and outer portions 67, 65. Again, the cross-sectional shape of the ring 60 provides substantial stiffness, though the individual portions 63, 65, 67 and 69 of the ring 60 are relatively thin. As shown in FIG. 1E, the aft-most vane 57 is positioned forward of the ring 60, and the ring 60 is positioned behind the rearmost extent 11 of the exhaust plume by a substantial distance "b". Accordingly, like the aft cascade ring 30 described above, the ring 60 has no substantial or direct effect on turning the exiting fan flow as the flow passes through the exit opening 15.

Though the aft cascade rings 30, 60 described above can be used to securely and rigidly connect the aft ends of thrust reverser cascade segments, they have some shortcomings. First, as discussed above, the aft cascade rings 30, 60 play no substantial or direct role in turning exiting fan flow, and thus are ancillary to the primary function of their cascade assemblies 20, 50. Second, because the aft cascade rings 30, 60 are positioned aft of the aft-most cascade vanes 27, 57, the aft cascade rings 30, 60 add to the overall length of the cascade assemblies 20, 50, as well as add extra weight to the cascades 20, 50 without directly contributing to their air-turning function. Accordingly, at least for these reasons, there is a need for an improved thrust reverser cascade assembly with an improved aft cascade ring that directly contributes to the air-turning function of the cascade assembly, as well as for its primary function of offering structural support for the aft end of the cascade array. This effectively reduces the overall length and weight of the cascade assembly.

SUMMARY

In one embodiment, an aircraft engine thrust reverser cascade assembly includes a plurality of circumferentially spaced cascade segments, each cascade segment including a plurality of spaced vanes including an aft-most vane and an aft end. The cascade assembly can further include a flow deflection shelf that forms a rear or aft end of the cascade segment and removably attaches to an aft cascade ring. The flow deflection shelf generally includes an upstanding wall or body portion and a deflector portion that extends forwardly, away from the aft end of the cascade segment. The deflector portion of each flow deflection shelf can be configured to at least partially redirect, in the forward direction, at least a portion of the volume of fan air flow as the air flow passes through the aft-most cells or airflow passages defined between the aft-most vanes of the cascade segment and the body of the flow deflection shelf. The upstanding wall or body portion of each deflection shelf can define an aft connection area of each cascade segment to enable attachment of an aft cascade ring to the aft end of the cascade assembly.

In another embodiment, the aircraft engine thrust reverser cascade assembly can have a plurality of cascade segments, each including a plurality of spaced vanes and support rails defining cells or airflow passages therebetween, and at least one flow deflection shelf mounted along a section intermediate the forward and rearward ends of the cascade segment. In such an embodiment, the flow deflection shelf can include a substantially longitudinally projecting deflector portion that can be mounted to an intermediate cascade vane or can be formed with a body section defining the intermediate cascade vane. The deflector portion extends forwardly from the intermediate cascade vane, at least partially overlying a series of intermediate cells and is configured to redirect, in the forward direction, at least some of the air passing through the cascade segment forward of the flow deflection shelf. The flow deflection shelf can extend laterally so as to define a hoop support structure around the cascade assembly, assisting in the secure connection of the cascade segments and enabling a reduction in size and weight required for the aft cascade ring mounted about the aft end of the cascade assembly.

These and other aspects and features of the invention will be understood from a reading of the following detailed description, together with the drawings. Those skilled in the art further will appreciate the advantages and benefits of the various additional embodiments discussed herein upon reading the following detailed description of the embodiments with reference to the below-listed drawing figures.

According to common practice, the various features of the drawings discussed below are not necessarily drawn to scale. Dimensions of various features and elements in the drawings may be expanded or reduced to more clearly illustrate the embodiments of the disclosure.

BRIEF DESCRIPTION OF THE DRAWINGS

FIG. 2A is a partial cross-sectional view of a thrust reverser in a stowed configuration that includes one embodiment of a cascade assembly with a flow deflection shelf according to the invention.

FIG. 2B is a partial cross-sectional view of the thrust reverser shown in FIG. 2A, with the translating sleeve in a deployed position.

Corresponding parts are designated by corresponding reference numbers throughout the drawings.

DETAILED DESCRIPTION

Figure 1A:
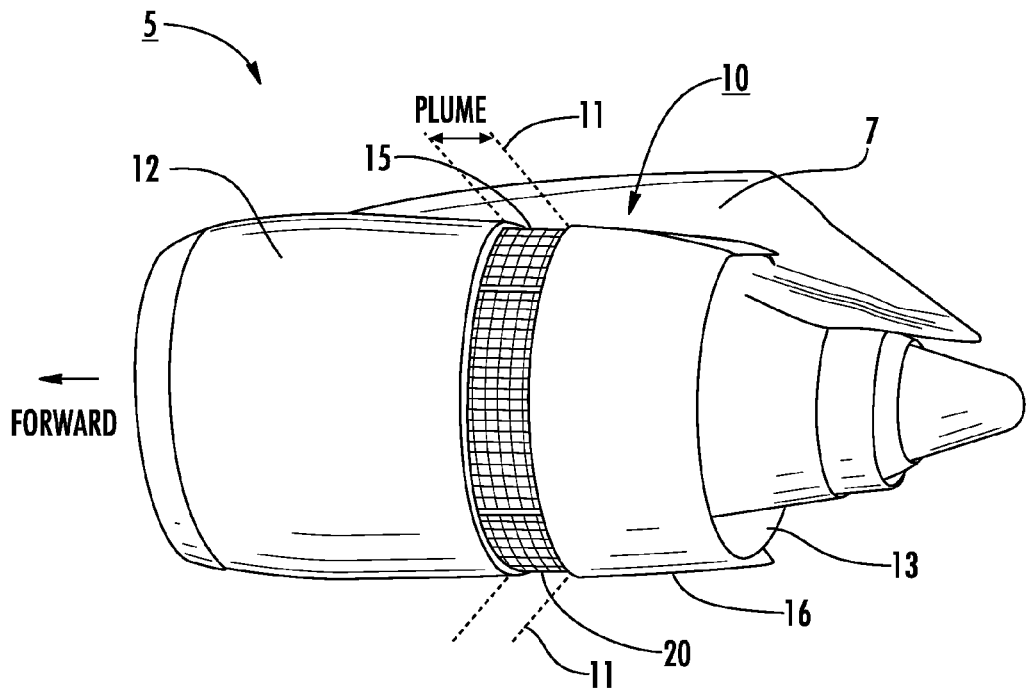
FIG. 1A is a perspective view of a prior art turbofan aircraft engine with a deployed cascade-type thrust reverser.
Figure 1B:
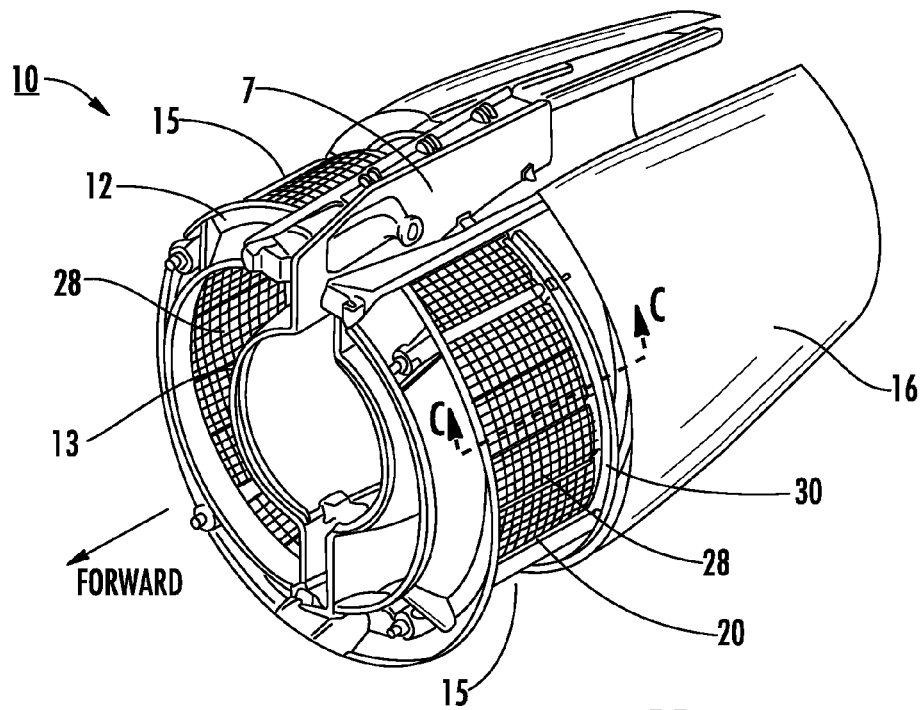
FIG. 1B is a perspective view of the prior art cascade-type thrust reverser shown in FIG. 1A.
Figure 1C:
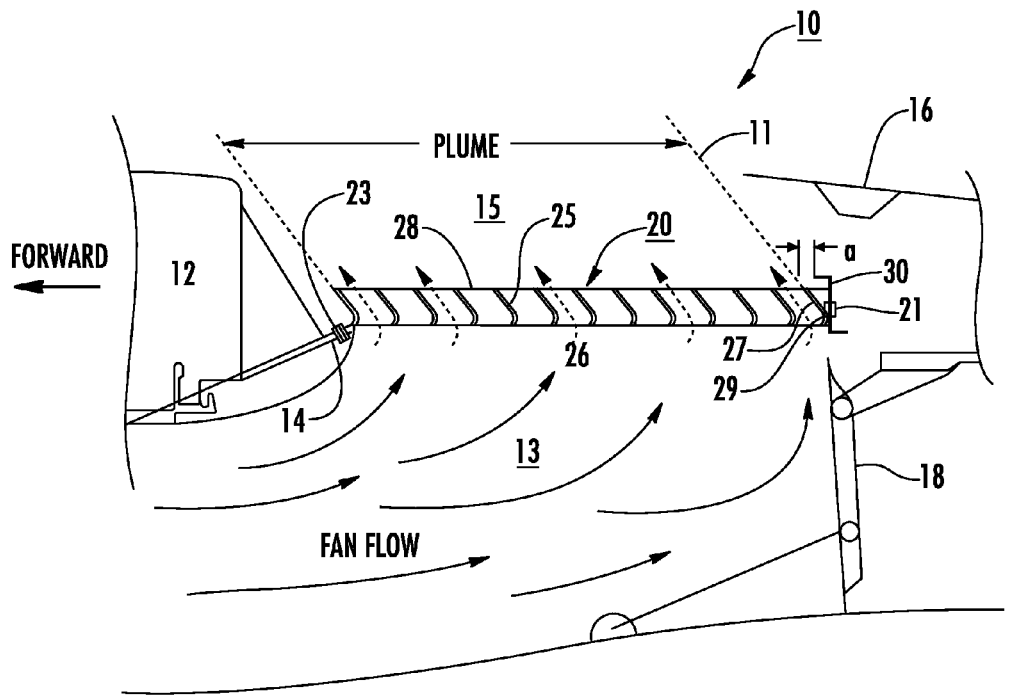
FIG. 1C is a partial cross-sectional view of the prior art cascade-type thrust reverser shown in FIGS. 1A and 1B taken along line C-C in FIG. 1B.

One embodiment of a thrust reverser 200 including one embodiment of a cascade assembly 100 and with flow deflection shelf 110 according to the invention is shown in FIGS. 2A and 2B. The thrust reverser 200 generally includes a translating sleeve 16 movably attached to the aft end of a stationary portion 12 of a nacelle. In FIG. 2A, the translating sleeve 16 is shown in a retracted or stowed position, with blocker door(s) 18 stowed in a position adjacent to the interior surface of the translating sleeve. In FIG. 2B, the translating sleeve 16 is shown in a deployed position. In the deployed position, the blocker door(s) 18 is extended into the fan duct 13 to block fan flow through the duct 13. As also shown in FIG. 2B, deployment of the translating sleeve 16 opens an air flow exit passage 15 in the nacelle structure, and exposes the cascade assembly 100 disposed within the exit passage 15.

Figure 3A:
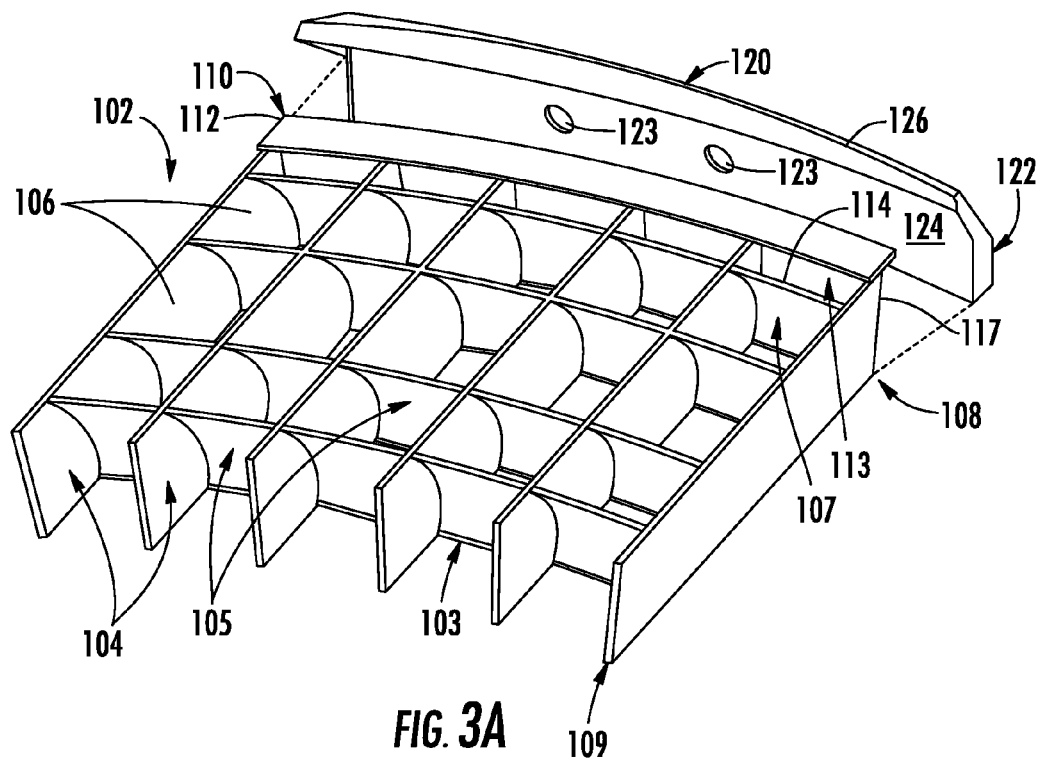
FIG. 3A is a perspective view of one embodiment of a cascade segment of the cascade assembly with a flow deflection shelf according to the invention.

The cascade assembly 100 includes a plurality of cascade segments 102. As indicated in FIGS. 2A-3A, each cascade segment 102 includes a body 103 having longitudinally extending support ribs or rails 104 and a plurality of spaced, generally laterally extending vanes 105 each configured to turn the flow of air being exhausted through the exit passage 15 (FIGS. 2A-2B) toward an at least partially forward direction. The cascade segments 102 also include aft-most vanes 107. The vanes 105 generally have a curved, concave configuration, although other configurations also can be provided. As shown in FIGS. 3A and 4A, each cascade segment 102 includes an aft or rear end 108, a forward end 109, and a series of cells or flow passages 106 defined between the support rails 104 and spaced vanes 105. The forward end 109 of each cascade segment 102 generally is removably connected to one or more flanges 14 on the aft end of the stationary portion 12 of the nacelle structure. The forward end of each cascade segment 102 can be connected to the flange or flanges 14 by one or more removable fasteners 23 of a type or types known in the art.

Figure 3B:
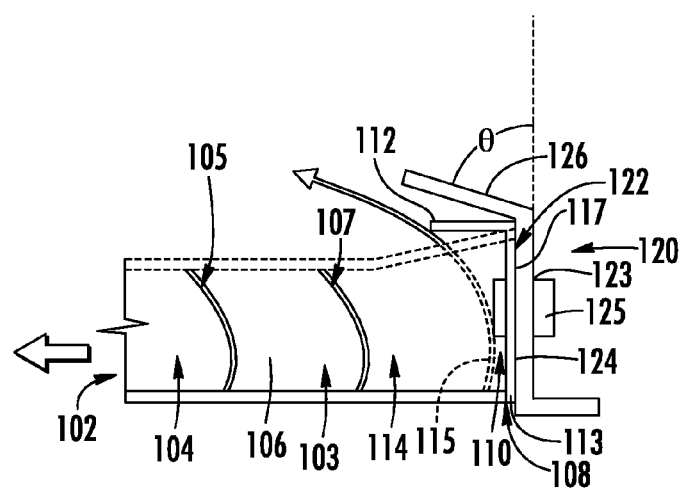
FIG. 3B is a partial cross-sectional view of the aft end of the cascade assembly with a flow deflection shelf of the thrust reverser shown in FIGS. 2A-3A.
Figure 4A:
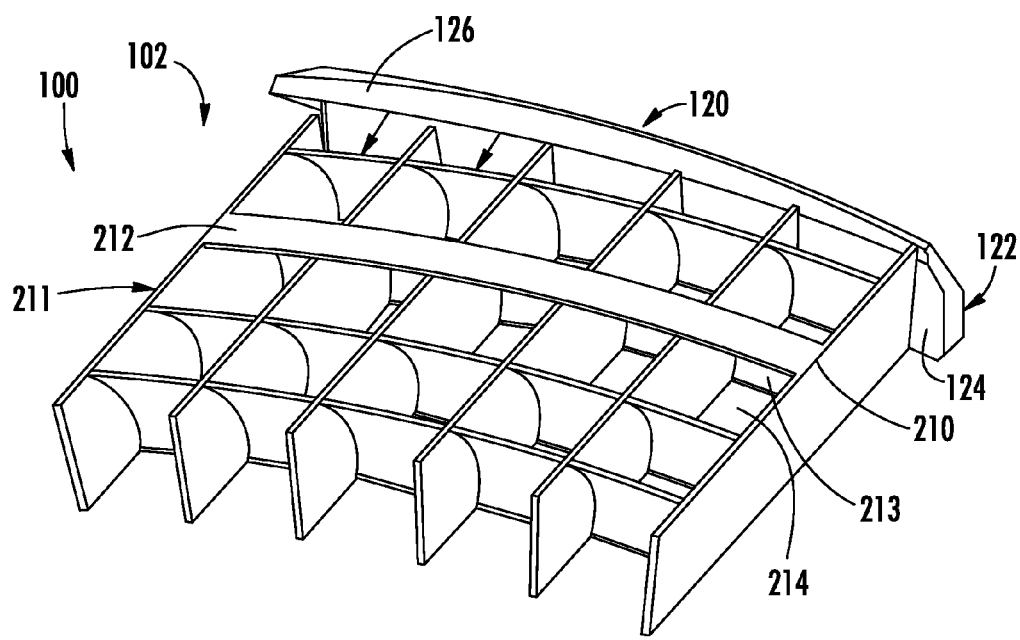
FIG. 4A is a perspective review of another embodiment of a cascade segment of the cascade assembly with a flow deflection shelf according to the present invention.

In one embodiment of the cascade assembly 102 illustrated in FIGS. 3A-3B, the aft end 108 of each cascade segment 102 can include a flow deflection shelf 110 that is mounted to the aft ends of the support rails 104 in a position spaced from the aft-most vanes 107. The flow deflection shelf 110 can be mounted to the aft end of its associated cascade segment such as by fasteners, adhesives, welding or other attachment or joining means as understood by those skilled in the art. Each flow deflection shelf 110 can be formed from a lightweight, substantially rigid and high-strength material, including various metals or metal alloys such as aluminum, titanium, steel or similar metal materials, or can be formed from various high-strength composites or synthetic materials. As shown in FIGS. 3A-3B, the flow deflection shelf 110 has a substantially orthogonal, L-shaped configuration, including a generally longitudinally oriented, forwardly extending deflector portion 112, and an upstanding body or wall portion 113. Other configurations are within the scope of the invention, such as configurations that are not perfectly orthogonal.

FIG. 3B shows an enlarged detail of one configuration of the aft end 108 of a cascade segment 102 of the embodiment of the cascade assembly 100 described above. In this embodiment, the aft end of each cascade segment 102 to which the aft cascade ring 120 mounts is defined by the upstanding body or wall portion 113 of the flow deflection shelf 110. The body portion 113 of this embodiment is generally configured to provide a substantially flat rear or aft wall to the aft end of each cascade segment, and is spaced axially rearward of the aft-most vanes 107 so as to define aft cells or air passages 114 for each cascade segment. As shown in FIG. 3A, the vanes 105, including aft-most vanes 107, and the body portion 113 of the flow deflection shelf of each cascade segment 102 can be supported by two or more spaced apart and longitudinally extending support rails 104. By providing space between the aft-most vane 107 and the deflection shelf 110, exiting fan flow can pass through the aft-most cells or air passages 114 therebetween, as indicated in FIG. 3B by dashed arrow 115.

Additionally, in the present embodiment, as indicated in FIG. 3B, the forwardly extending deflector portion 112 of the flow deflection shelf 110 is shown as oriented at a 90° angle with respect to its body portion 113, although it will be understood that the deflector portion also can be oriented at greater or lesser angles. In embodiments utilizing the 90° angle configuration, the deflector portion 112 of flow deflection shelf 110 is closely spaced from and generally oriented substantially flush with the upper edges of the support rails of its associated cascade segment. Optionally, the deflector portion 112 of each flow deflection shelf 110 has an arcuate configuration that closely matches the arcuate configuration of its associated cascade segment, across the width of the segment. As such, the deflector portion 112 abuts the body 103 of each cascade segment, thereby forming a supporting hoop structure that provides structural support to the cascade segments in their connected configuration.

The body portion 113 of the flow deflection shelf 110 includes a flat aft end wall 113, thus defining a substantially flat mounting surface 117 for attachment of an aft cascade ring 120 to the aft end of each cascade segment. By providing such a flat wall 113 and its associated flat mounting surface 117, the aft cascade ring 120 is in flat lying contact or flush mounting abutment with the body portion of the flow deflection shelf, thus placing the aft cascade ring into a closer, tighter engagement with the aft ends of the cascade segments as compared to prior art structures. This can significantly reduce the amount of longitudinal space required within the nacelle for the aft cascade ring when mounted to the cascade segments, and accordingly provide increased clearance for operation of the thrust reverser and cascade structure.

Figure 5:
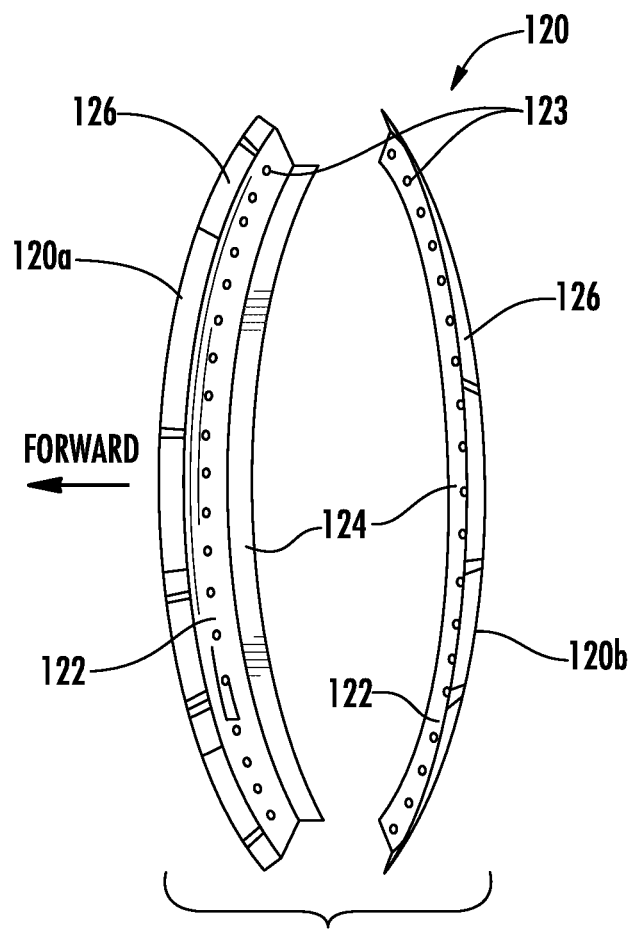
FIG. 5 is a perspective view of an aft cascade ring for attachment to the aft ends of the cascade segments of the cascade assembly.

One embodiment of an aft cascade ring 120 for use with a cascade assembly 100 such as described above is generally shown in FIGS. 2A-2B and 5. As shown in FIG. 5, though the aft cascade ring 120 is referred to herein as a "ring," the aft cascade ring 120 can be constructed in two or more arcuate parts which may or may not combine to form a complete 360-degree ring structure. For example, the aft cascade ring 120 can include two or more arcuate parts or sections 120a, 120b that are mirror images of either, each including a body portion 122, an outer or "deflector" portion 126, and an inner portion 124. In the embodiment shown in FIG. 5, the body portion 122 is substantially flat, and lies in a plane that is substantially transverse to the longitudinal axis of an associated aircraft engine, with a plurality of mounting holes or openings 123 for use in removably fastening the ring 120 to the cascade segments 102. The inner portion 124 of the ring 120 can be substantially cylindrical in shape, and can rearwardly extend from an inner edge of the body portion 122, with the inner portion 124 arranged substantially perpendicular to the body portion 122.

Figure 1D:
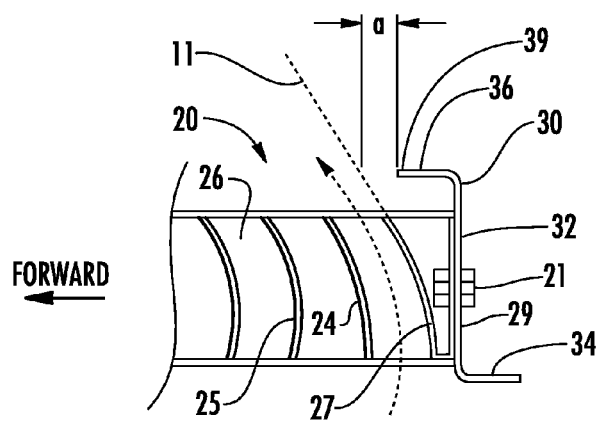
FIG. 1D is a partial cross-sectional view of the prior art cascade-type thrust reverser shown in FIG. 1C showing the aft end of the cascade array and a prior art aft cascade ring.
Figure 1E:
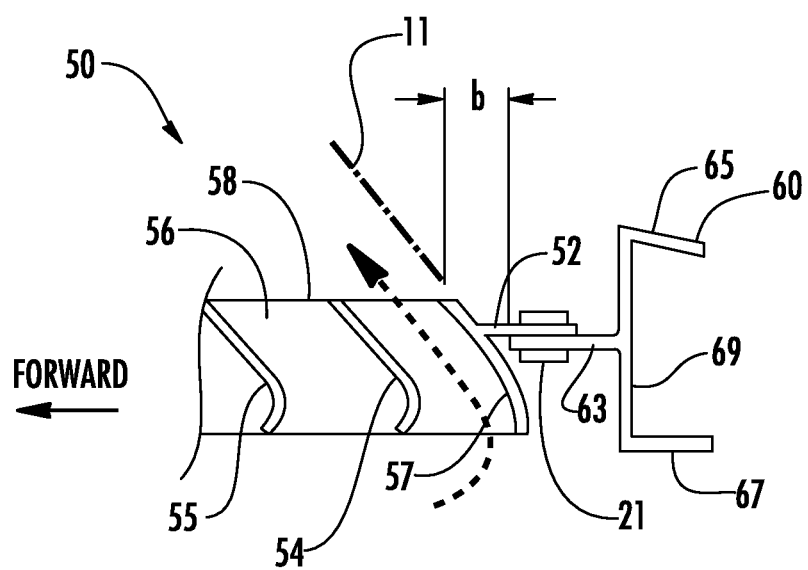
FIG. 1E is a partial cross-sectional view like that of FIG. 1D showing the aft end of cascade array and another type of prior art aft cascade ring.

In prior art structures such as shown in FIG. 1D, the cascade segments often require an additional rear wall that is mounted behind the aft-most vane (indicated at 27) to enable connection of the aft cascade ring to the cascade segments. Alternatively, as indicated in FIG. 1E, if the aft-most vane 57 of the cascade segments comprises the rear or aft wall of the cascade segments, the curved construction of the vanes generally requires the cascade ring to be connected to the aft-most vanes of the cascade segments by horizontally extending flanges 52 and 63 attached via fasteners 21. In addition to significantly reducing the horizontal space and enabling a closer fit and engagement between the cascade ring and aft end of the cascade segments to which it is attached, the present invention eliminates the need for such additional attachment flanging, such as shown in FIG. 1E, and the requirement for an additional aft wall portion as shown in FIG. 1D. This in turn helps provide significant weight reduction and enables the aft cascade ring to be formed in varied sizes (e.g., being made taller) as needed to increase aerodynamic operation of the thrust reverser.

As indicated in FIG. 3B, the body portion 113 of each flow deflection shelf 110 can be removably connected to the aft cascade ring 120, such as by one or more removable fasteners 125 of a type or types known in the art. For example, the aft end of each cascade segment 102 can be removably connected to the aft cascade ring 120 by one or more sets of nuts and bolts or can be more permanently attached such as by rivets, etc. The connection of the aft cascade ring 120 to the body portion 113 of the flow deflection shelf 110 by fasteners 125 further is illustrated as being a longitudinally extending connection whereby the fasteners 125 extend in a forward direction through the body of the aft cascade ring and the body portions of the flow deflection shelves. This longitudinal connection aligns the fasteners in a shear-loading orientation to provide added strength, as opposed to a tension loaded attachment such as created by the connection illustrated in the prior art structure of FIG. 1E. The attachment of the aft cascade ring 120 to the cascade segments ties the aft ends 108 of the cascade segments 102 together, adds stiffness to the cascade assembly 100, and restrains the outward deflection of the cascade segments 102 when the cascade segments 102 are exposed to high velocity air flow passing through the exit passage 15. The flow deflection shelf 110 further can assist in providing structural continuity and support to the connected cascade segments, which in turn can enable a reduction in size, and thus weight of the aft cascade ring.

In operation, as the thrust reverser is engaged, the fan air flow is directed radially outwardly toward the cells or airflow passages 106 and 114 defined between the vanes and support rails of the cascade segments. The substantially curved or arcuate configuration of the vanes causes the airflow to be redirected in the forward direction to provide reverse thrust. The aft-most airflow, indicated by dashed lines 115 in FIG. 3B, flows into the aft-most cells 114 and is directed substantially forwardly by impingement against the underside surface of the deflector portion 112 of the flow deflection shelf 110.

The aft cascade ring 120 further can include an angled deflector portion 126 that extends forwardly at a desired angle to assist in deflection of the aft-most air flow. As shown in FIGS. 3B and 5, the deflector portion 126 of one embodiment of the aft cascade ring 120 can generally extend in the forward direction from the outer edge of the body portion 122. The deflector portion 126 can extend at an angle "θ" relative to the body portion 122. In the embodiment shown, the angle "θ" between the deflector portion 126 and the body portion 122 is less than 90 degrees. In one embodiment, the angle "θ" is between about 60 degrees and about 90 degrees, though angles less than 60 degrees may also be used. In one embodiment of the aft cascade ring 120, the deflector portion 126 can have a substantially frusto-conical shape having a largest diameter at its forward edge. Alternatively, the deflector portion 126 can have other shapes, such as a substantially arcuate shape. This deflector portion 126 also can be of an extended length, and generally is of a length greater than the deflector portion 112 of the flow deflection shelf 110 against which it is mounted so as to substantially overlap the deflector portion 112 of the flow deflection shelf 110 and further help direct the aft-most airflow forwardly during a reverse thrust operation.

Figure 4B:
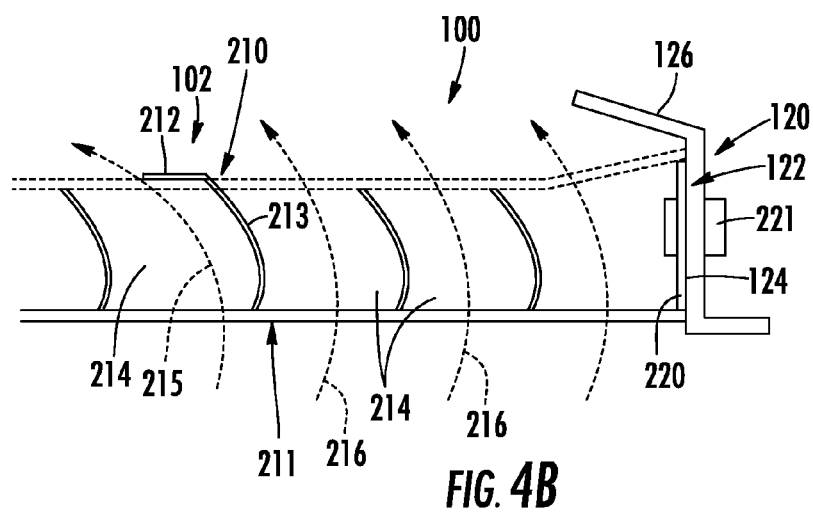
FIG. 4B is a cross-sectional view of the cascade segment shown in FIG. 4A.

In an additional embodiment of the cascade assembly 100 illustrated in FIGS. 4A and 4B, a flow deflection shelf 210 can be mounted along an intermediate portion 211 of an associated cascade segment 102, spaced axially forward of the aft-most vanes of the cascade segment and the aft cascade ring 120. In this embodiment, the flow deflection shelf 210 can include a deflector portion 212 that is mounted to the upper ends of an intermediate vane 213 of its associated cascade segment, or, alternatively, can be integrally formed as a unitary structure with the intermediate vane, wherein the intermediate vane 213 defines a body portion of the flow deflection shelf. In this embodiment, the deflector portion 212 of each flow deflection shelf 210 generally will comprise a substantially longitudinally oriented shelf or projection that will extend forwardly, at least partially overlying or covering the intermediate cells or flow passages 214 located directly in front of the flow deflection shelf. The deflector portion 212 is preferably integral with the intermediate vanes 213 and redirects at least a portion of the volume of an airflow 215 passing therethrough in a forward direction. Additionally, in the construction of the flow deflection shelf wherein the flow deflection shelf is integrally formed with the intermediate vane 213 of its associated cascade segment, the flow deflection shelf can also include a substantially straight, vertically extending body portion or wall as well.

As further illustrated in FIG. 4B, each cascade segment 102 typically can include a substantially flat rear wall portion 220, which can be formed from a light weight material, and to which the aft cascade ring 120 is attached via fasteners 221, with the fasteners generally being oriented in a shear loading arrangement. The deflector portions of the flow deflection shelves for each of the cascade segments will extend laterally across their associated cascade segments, and will be arranged in a substantially flush mounting against the upper edges of the rails and intermediate vanes. The ends of these deflector portions can be connected in series so as to define or help provide a supporting hoop structure that extends about the cascade segments. Such a construction provides enhanced structural continuity for the attached cascade segments, effectively forming a structural band or hoop that can help tie the cascade segments together. By providing this additional frame continuity or hoop structure for the cascade segments, the aft cascade ring can be reduced in size and thus reduced in weight as some of the structural load for maintaining the cascade segments connected in series is being taken up by the flow deflection shelf. Such reduction in size and weight of the aft cascade ring can offset any further weight from the addition of back wall sections of the cascade segments to which the aft cascade ring is attached.

Still further, it will be understood by those skilled in the art that a plurality of flow deflection shelves can be used with the cascade segments formed according to the principles of the present invention. For example, a first flow deflection shelf can be mounted at the aft end of its associated cascade segment, as illustrated in FIGS. 3A and 3B, to provide a substantially flat connection surface for the aft cascade ring and provide the desired redirection of the air flowing through the aft-most cells or air passages 114. In addition, one or more additional flow deflection shelves can be mounted at various intermediate locations along the length of the cascade segments, with these additional flow deflection shelves generally being spaced forwardly from the aft mounted flow deflection shelf. The use of the intermediate flow deflection shelves further can provide the desired enhancements in structural hoop continuity for the cascade array, while additionally enabling the flow deflection shelves and/or the aft cascade ring to be made from light weight materials to help reduce the overall weight of the cascade assembly, without an undesirable reduction in the structural strength and hoop continuity of the attached cascade segments.

The use of one or more flow deflection shelf 110 according to the principles of the present invention thus can help minimize the weight of the cascade assembly, by enabling the thickness or thicknesses of the body portion 122, the inner portion 124, the outer portion 126, and any other portions of the aft cascade ring to be substantially minimized. The present invention further can facilitate the use of varied configuration and size aft cascade rings that can further help substantially reduce the length and weight of the cascade assembly 100. In addition, the cross-sectional shape of the aft cascade ring 120 can be configured to provide adequate stiffness against bending and twisting, while also minimizing weight. For example, the aft cascade ring 120 can be constructed of composite materials in a single piece using known composite fabrication processes. Alternatively, the aft cascade ring 120 can be constructed of strong and lightweight material or combination of materials, such as aluminum, titanium, composites or the like, and also can be constructed in a single piece, or fabricated by joining multiple pieces or sections together.

The embodiments of the invention described above are intended to illustrate various features and aspects of the invention. Persons of ordinary skill in the art will recognize that various changes and modifications can be made to the described embodiments without departing from the invention. For example, though various embodiments of an aft cascade ring have been described as having particular cross sectional shapes and specific portions, an aft cascade ring according to the invention can include various cross sectional shapes and/or portions that are different from the specifically described embodiments. All such changes and modifications are intended to be within the scope of the appended claims.

What is claimed is:

1. An aircraft engine thrust reverser cascade assembly comprising:
    (a) a plurality of circumferentially spaced cascade segments, each cascade segment including a forward end, an aft end, and a plurality of ribs and spaced vanes defining a series of air passages therebetween, and with the vanes including an aft-most vane; and
    (b) a flow deflection shelf mounted along the aft end of each cascade segment, the flow deflection shelf mounted substantially perpendicular to the aft most vanes and configured to at least partially redirect at least a portion of air passing through each cascade segment forwardly as the air passes outwardly between aft-most vanes and the aft end of each cascade segment; and (c) an aft cascade ring comprising a body portion and a deflection portion, the body portion attached to each cascade segment and the deflection portion position to form an angle of less than ninety degrees relative to the flow deflection.

2. An aircraft engine thrust reverser cascade assembly according to claim 1 wherein the deflector portion comprises a shelf extending at least partially forward over the air passages between the aft-most vanes and the body portion of the flow deflection shelf.

3. An aircraft engine thrust reverser cascade assembly according to claim 1 wherein the body portion of the flow deflection shelf defines an aft wall of each cascade segment.

4. An aircraft engine thrust reverser cascade assembly according to claim 1 wherein the aft cascade ring further includes a body portion having an inner portion adjacent and connected to the body portion of the flow deflection shelf.

5. An aircraft engine nacelle with a thrust reverser cascade assembly comprising:

(a) a plurality of circumferentially spaced cascade segments, each cascade segment comprising a series of rails and spaced vanes, including an aft-most vane, spaced rows of air flow passages defined between the rails and vanes, and an aft end; and (b) an aft cascade ring attached to the aft end of each cascade segment with a plurality of fasteners, the aft cascade ring comprising a body and an deflection portion; and (c) an air flow deflector mounted on at least a portion of the aft most vane, and between the aft most vane and the deflection portion, the air flow deflector at least partially perpendicularly overlying an aft most row of air flow passages for redirecting at least a portion of air passing outwardly through the selected row of air flow passages.

6. An aircraft engine nacelle according to claim 5 wherein the air flow deflector comprises at least one flow deflection shelf mounted to at least one cascade segment and including a deflector portion positioned aft of the aft-most vane and wherein the deflector portion extends forwardly of the aft end of the at least one cascade segment, and a body portion defining a substantially flat aft end wall to which the aft cascade ring is attached in a substantially flush-mounted arrangement.

7. An aircraft engine nacelle according to claim 6 wherein the deflector portion has a substantially flat, forwardly extending configuration at least partially overlying a row of aft-most air flow passages defined between the aft-most vane of the at least one cascade segment and the body portion of the flow deflection shelf.

8. An aircraft engine nacelle according to claim 5 wherein each flow deflection shelf is connected in series to define a hoop structure extending about and supporting the cascade segments to form the cascade assembly.

9. An aircraft engine nacelle according to claim 5 wherein the aft cascade ring comprises at least two arcuate ring segments.

10. A cascade assembly for an aircraft engine thrust reverser, comprising:

(a) a plurality of cascade segments connected in series, each of said cascade segments including an aft end, a forward end, a series of longitudinally extending rails, a series of laterally extending vanes, including an aft-most vane connected to said rails, and a plurality of rows air flow passages defined between said rails and said vanes;

(b) an aft cascade ring comprising a body portion and a flow deflection portion mounted to said aft end of each cascade segment, the body portion configured for attaching and maintaining said cascade segments in connected series and the flow deflection portion configured to at least partially direct air flow exhausted through an aft row of air flow passages; and (c) a plurality of flow deflection shelves, each mounted between each of said cascade segments and said aft cascade ring and including a forwardly extending deflector portion that at least partially overlies a selected row of air flow passages so as to redirect at least a portion of air passing through said selected row of air passages.

11. The cascade assembly of claim 10 wherein each of said flow deflection shelves is mounted adjacent said aft end of an associated cascade segment, spaced rearwardly from the aft-most vane of said associated cascade segment.

12. The cascade assembly of claim 11 wherein each of said flow deflection shelves further comprises an upstanding body portion defining a substantially flat aft wall of its associated cascade segment to which said aft cascade ring is attached in a substantially flush mounted arrangement.

13. The cascade assembly of claim 10 wherein each of said plurality of flow deflection shelves is mounted along said aft ends of said cascade segments, spaced rearwardly of said aft-most vane of each of said cascade segments and defining a substantially flat aft wall to which said aft cascade ring attaches in a substantially flush mounted arrangement.

14. The cascade assembly of claim 10 wherein said flow deflection shelves are connected in series to define a supporting hoop structure for connecting said cascade segments in series.

* * * * *

UNITED STATES PATENT AND TRADEMARK OFFICE
CERTIFICATE OF CORRECTION

PATENT NO. : 9,086,034 B2  
APPLICATION NO. : 13/308865  
DATED : July 21, 2015  
INVENTOR(S) : Michael Ray Aten et al.

Page 1 of 1

It is certified that error appears in the above-identified patent and that said Letters Patent is hereby corrected as shown below:

In the claims

In column 9, line 6, please delete "position" and insert therefor --positioned--.

In column 9, line 8, after "deflection" please insert --shelf--.

In column 9, line 10, please delete "deflector portion" and insert therefor --flow deflection shelf--.

In column 10, line 4, please delete "5" and insert therefor --6--.

Signed and Sealed this  
First Day of December, 2015

Michelle K. Lee  
*Director of the United States Patent and Trademark Office*